US011951735B2

(12) United States Patent
Ishino et al.

(10) Patent No.: US 11,951,735 B2
(45) Date of Patent: Apr. 9, 2024

(54) PRINTING DEVICE AND METHOD FOR CONTROLLING PRINTING DEVICE

(71) Applicant: SEIKO EPSON CORPORATION, Tokyo (JP)

(72) Inventors: Hitoshi Ishino, Shimosuwa-machi (JP); Takehiro Kobayashi, Matsumoto (JP); Masanori Yumoto, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 17/529,628

(22) Filed: Nov. 18, 2021

(65) Prior Publication Data

US 2022/0153043 A1 May 19, 2022

(30) Foreign Application Priority Data

Nov. 19, 2020 (JP) ................................ 2020-192512

(51) Int. Cl.

*B41J 13/10* (2006.01)
*B41J 2/35* (2006.01)
*B41J 2/355* (2006.01)
*B41J 11/00* (2006.01)
*B41J 11/42* (2006.01)
*B41J 29/393* (2006.01)

(52) U.S. Cl.

CPC .............. *B41J 13/103* (2013.01); *B41J 2/35* (2013.01); *B41J 2/355* (2013.01); *B41J 11/008* (2013.01); *B41J 11/42* (2013.01); *B41J 29/393* (2013.01)

(58) Field of Classification Search

CPC ... B41J 2/35; B41J 2/355; B41J 11/008; B41J 11/42; B41J 29/393
See application file for complete search history.

(56) References Cited

U.S. PATENT DOCUMENTS

2014/0210932 A1* 7/2014 Chen ........................ B41J 2/355
347/211

FOREIGN PATENT DOCUMENTS

JP H08258314 A 10/1996

* cited by examiner

*Primary Examiner* — Thinh H Nguyen
(74) *Attorney, Agent, or Firm* — CHIP LAW GROUP

(57) ABSTRACT

A printing device includes: a printing unit printing on a recording paper; a feeder unit having a roller that rotates about a shaft and feeds the recording paper and a motor that rotates the shaft; a detection unit detecting the rotation of the shaft; and a control unit controlling the printing unit. The control unit calculates an electrifying time during which the printing unit is electrified and a non-electrifying time during which the printing unit is not electrified following the electrifying time, based on a detection signal from the detection unit. When the calculated non-electrifying time is less than a predetermined time, the control unit corrects the non-electrifying time in such a way that the non-electrifying time becomes equal to or longer than the predetermined time, and causes the printing unit to print.

4 Claims, 7 Drawing Sheets

PRINTING DEVICE AND METHOD FOR CONTROLLING PRINTING DEVICE

The present application is based on, and claims priority from JP Application Serial Number 2020-192512, filed Nov. 19, 2020, the disclosure of which is hereby incorporated by reference herein in its entirety.

BACKGROUND

1. Technical Field

The present disclosure relates to a printing device and a method for controlling a printing device.

2. Related Art

According to the related art, a printing device in which an electrifying time and a non-electrifying time for a printing unit such as a thermal head are decided in the form of ratio is known, as described in JP-A-8-258314.

The printing unit may deteriorate if a non-electrifying time equal to or longer than a predetermined time is not secured. However, in the printing device described in JP-A-8-258314, depending on the ratio to the electrifying time, the non-electrifying time equal to or longer than the predetermined time may not be able to be secured and therefore the printing unit may deteriorate.

SUMMARY

A printing device includes: a printing unit printing on a recording paper; a feeder unit having a roller that rotates about a shaft and feeds the recording paper and a motor that rotates the shaft; a detection unit detecting the rotation of the shaft; and a control unit controlling the printing unit. The control unit calculates an electrifying time during which the printing unit is electrified and a non-electrifying time during which the printing unit is not electrified following the electrifying time, based on a detection signal from the detection unit. When the calculated non-electrifying time is less than a predetermined time, the control unit corrects the non-electrifying time in such a way that the non-electrifying time becomes equal to or longer than the predetermined time, and causes the printing unit to print.

A method for controlling a printing device is provided. The printing device includes: a printing unit printing on a recording paper; a feeder unit having a roller that rotates about a shaft and feeds the recording paper and a motor that rotates the shaft; a detection unit detecting the rotation of the shaft; and a control unit controlling the printing unit. The method includes: calculating an electrifying time during which the printing unit is electrified and a non-electrifying time during which the printing unit is not electrified following the electrifying time, based on a detection signal from the detection unit; and when the calculated non-electrifying time is less than a predetermined time, correcting the non-electrifying time in such a way that the non-electrifying time becomes equal to or longer than the predetermined time, and causing the printing unit to print.

DESCRIPTION OF EXEMPLARY EMBODIMENTS

1. Embodiment

1-1. Configuration of Printing Device 1

Figure 1:
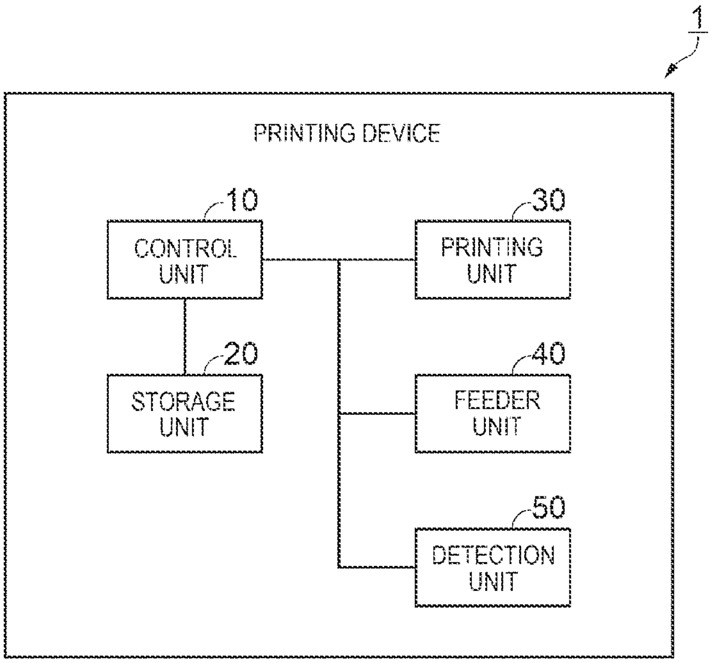
FIG. 1 is a block diagram showing the configuration of a printing device.
Figure 2:
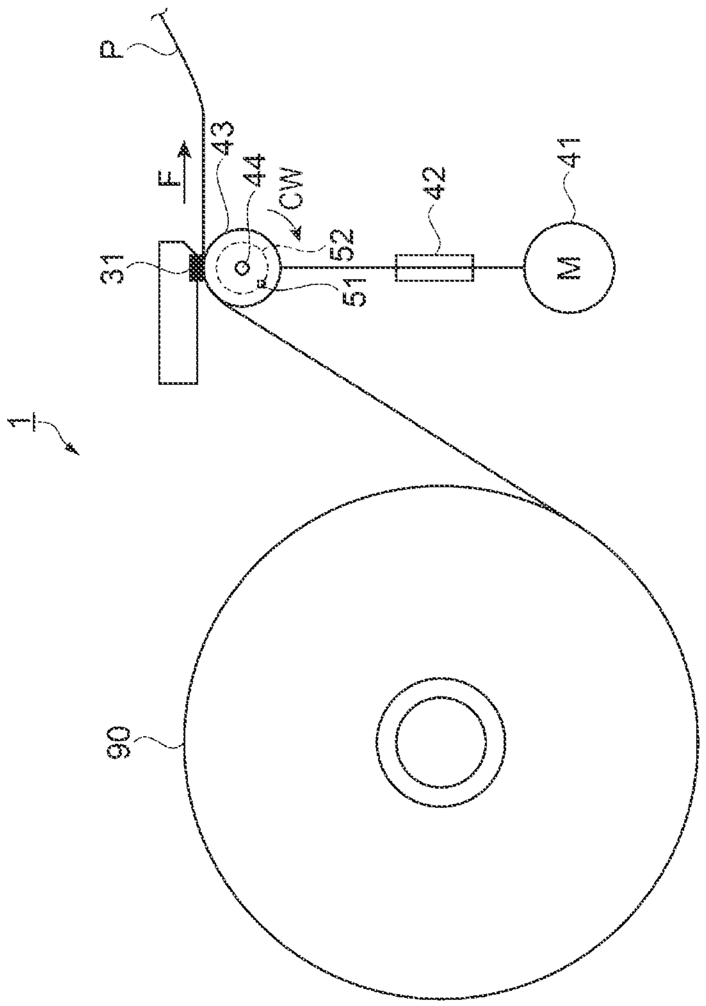
FIG. 2 is a cross-sectional view showing a main part of the printing device.

A printing device 1 shown in FIGS. 1 and 2 is, for example, a line thermal printer. As shown in FIG. 1, the printing device 1 has a control unit 10, a storage unit 20, a printing unit 30, a feeder unit 40, and a detection unit 50.

The control unit 10 has a CPU. The CPU is also referred to as a processor. The control unit 10 reads out and executes a program such as firmware stored in the storage unit 20 and thus controls each part of the printing device 1.

The printing unit 30 has a head 31, as shown in FIG. 2. The head 31 is, for example, a line thermal head. The printing unit 30 also has a pressing mechanism for pressing the head 31 toward a roller 43. A recording paper P is a thermal paper. While the head 31 is in contact with the recording paper P by the pressing mechanism, color development takes place due to heat generation by the head 31 and thus printing is performed. The control unit 10 controls the head 31 to print, based on print data received from an external device. The recording paper P on which printing is performed by the head 31 is cut by a cutter and discharged from a discharge port.

The feeder unit 40 is configured in such a way that a motor 41 rotates under the control of the control unit 10, transmits the rotation thereof to a shaft 44 while reducing the speed via a gear 42, and thus causes the roller 43 to rotate about the shaft 44 and feed the recording paper P, as shown in FIG. 2. The roller 43 is cylindrically formed of a flexible resin material or the like, such as a rubber, and is fixed to the shaft 44. The roller 43 is arranged at a position opposite the head 31 via the recording paper P and is also referred to as a platen.

The motor 41 is, for example, a DC motor. The control unit 10 takes in a detection signal from the detection unit 50, described later, detects the speed of the motor 41, and performs PWM (pulse-width modulation) control on the motor 41 to rotate at a predetermined speed.

The recording paper P is accommodated in the printing device 1 as a paper roll 90 formed by rolling the recording paper P. The roller 43, together with the head 31 opposite the roller 43, nips the recording paper P due to the pressing by the pressing mechanism. When rotating, the roller 43 generates a feeding force F and thus draws out and feeds the recording paper P from the paper roll 90. The direction in which the roller 43 rotates when feeding the recording paper P is a clockwise CW direction.

The control unit 10 causes the printing unit 30 to print, while causing the feeder unit 40 to feed the recording paper P.

The detection unit 50 is a so-called rotary encoder detecting the rotational position of the shaft 44. The detection unit 50 is an optical encoder formed of a disk 52, which is a scale having slits formed at a predetermined interval, and a transmission-type photosensor 51 detecting the slits in the disk 52, as shown in FIG. 2.

The photosensor 51 is formed of a light-emitting element and a light-receiving element. The light-emitting element and the light-receiving element are arranged at positions sandwiching the disk 52. The disk 52 is attached in such a way as to rotate about the shaft 44. When the motor 41 causes the shaft 44 to rotate, the disk 52 rotates, too. When the position of a slit provided in the disk 52 coincides with a position on the optical path of the light-emitting element, the light passes through the slit and reaches the light-receiving element, and the light-receiving element detects the light. At this point, the light-receiving element generates a predetermined current. Therefore, a detection signal with a high-level voltage can be taken out. Meanwhile, when the positions of the slits do not coincide with a position on the optical path of the light-emitting element, the light is blocked by the disk 52 and the light-receiving element does not detect the light. At this point, the light-receiving element does not generate a predetermined current. Therefore, a detection signal with a low-level voltage can be taken out.

1-2. Control by Control Unit

Figure 3:
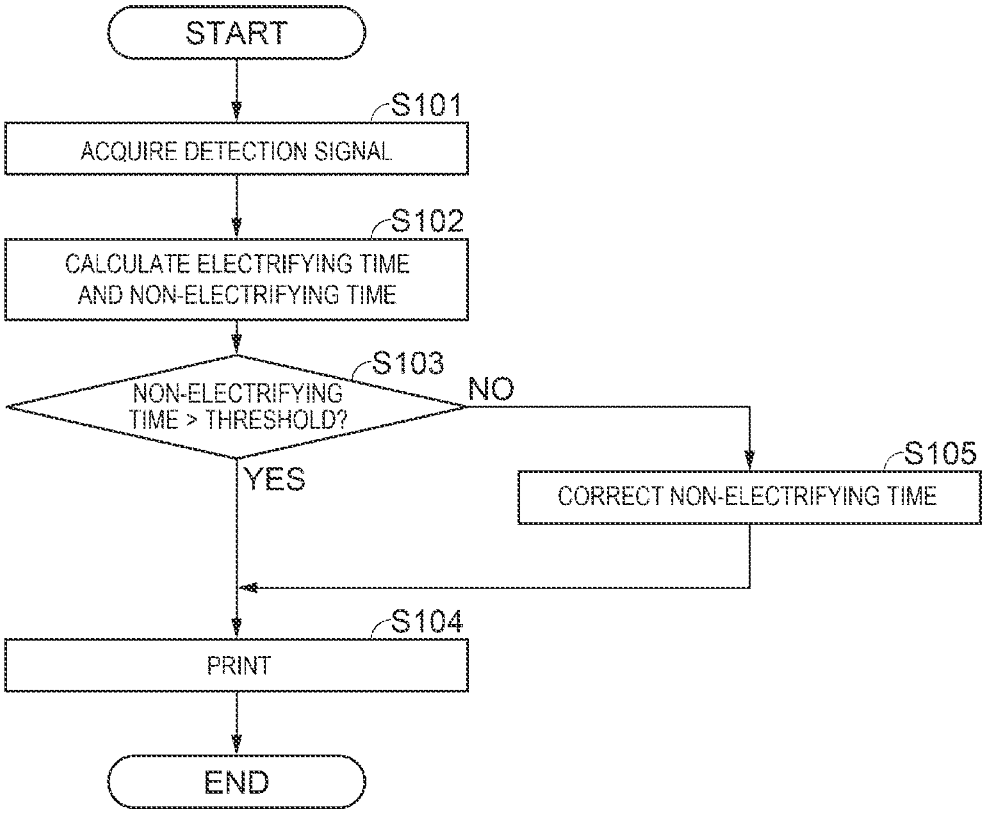
FIG. 3 is a flowchart showing control by a control unit according to an embodiment.

Control on the printing unit 30 performed by the control unit 10, based on a detection signal inputted from the detection unit 50, will now be described with reference to a flowchart shown in FIG. 3.

The control unit 10 starts control (START) and acquires a detection signal from the detection unit 50 (step S101). The detection signal is outputted from the detection unit 50 as a predetermined pulse formed of a signal with a high-level voltage and a signal with a low-level voltage, as the disk 52 rotates. In the description below, a pulse that is a detection signal is simply referred to as a pulse.

The control unit 10 acquires a pulse as an interrupt signal from an interrupt terminal. Specifically, the control unit 10 starts interrupt processing in response to a rise or a fall of the acquired pulse as a trigger. In the interrupt processing, the control unit 10 acquires time when an interrupt is generated, via a built-in timer. The control unit 10 stores the acquired time in the storage unit 20.

In the storage unit 20, the order of a pulse and time when the pulse is generated including such time in the past are stored. The control unit 10 compares the acquired time with the time in the past read out from the storage unit 20 and thus can calculate the period of an arbitrary pulse or the period between arbitrary pulses.

The control unit 10 can electrify the head 31 or start non-electrification in which the control unit 10 does not electrify the head 31, based on the timing when an interrupt by a pulse is generated. In the description below, a time during which the control unit 10 electrifies the head 31 is referred to as an electrifying time, and a time during which the control unit 10 does not electrify the head 31 is referred to as a non-electrifying time.

A pulse is generated based on the rotation of the disk 52 having slits opened with a predetermined interval.

Therefore, the control unit 10 can calculate the rotational speed of the shaft 44, based on the calculated period of the arbitrary pulse or the calculated period between the arbitrary pulses. Since the roller 43 rotates about the shaft 44 and feeds the recording paper P, the rotational speed of the shaft 44 is the feeding speed for the recording paper P as well. The control unit 10 can calculate the feeding speed for the recording paper P, based on the detection signal acquired from the detection unit 50.

When the head 31 is a line head such as a line thermal head, the control unit 10 can set a print cycle, which is the cycle of printing one dot line, based on a predetermined number of pulses of the detection signal.

In an example, in the detection unit 50, the resolution of the detection signal is set to 1440 pulses per inch. That is, the detection unit 50 is set in such a way that one pulse of the detection signal is outputted from the detection unit 50 every time the recording paper P is fed by the length of 1/1440 inches by the feeder unit 40. Meanwhile, in an example, the resolution of the head 31 is 180 dpi (dots per inch), that is, one dot every 1/180 inches. When the recording paper P is fed by the feeder unit 40 by the same length of 1/180 inches as the resolution of the head 31, eight pulses of the detection signal are outputted from the detection unit 50.

Therefore, the control unit 10 controls the head 31 on such a cycle as to print one dot line on the recording paper P during a period when eight pulses of the detection signal are inputted thereto from the detection unit 50. Thus, the head 31 prints one dot line on the recording paper P.

The value of the resolution of the detection signal and the value of the resolution of the head 31 are stored in the storage unit 20. The control unit 10 reads out and processes these values.

The control unit 10 controls the head 31 to print one dot line on the recording paper P, based on a set of an electrifying time and a non-electrifying time corresponding to the feeding speed for the recording paper P. For example, a calculation formula for calculating an electrifying time for the head 31 and a non-electrifying time for the head 31 corresponding to the feeding speed for the recording paper P is stored in the storage unit 20.

Specifically, a reference electrifying time and a reference non-electrifying time corresponding to a reference feeding speed are stored in the storage unit 20. Also, the ratios of the electrifying time and the non-electrifying time corresponding to the calculated feeding speed to the reference electrifying time and the reference non-electrifying time, respectively, are stored in the storage unit 20.

The control unit 10 calculates an electrifying time and a non-electrifying time for the head 31, referring to the storage unit 20 and based on the calculation formula corresponding to the calculated feeding speed for the recording paper P (step S102). Specifically, the control unit 10 acquires the ratio of each of the electrifying time and the non-electrifying time corresponding to the calculated feeding speed for the recording paper P and also acquires the reference electrifying time and the reference non-electrifying time, referring to the storage unit 20. The control unit 10 multiplies the reference electrifying time and the reference non-electrifying time by the acquired ratios, respectively, and thus calculates the electrifying time and the non-electrifying time.

Also, the electrifying time and the non-electrifying time for the head 31 corresponding to the feeding speed may be stored in advance in the form of a table in the storage unit 20. The control unit 10 can acquire the electrifying time and the non-electrifying time from the table, referring to the storage unit and based on the feeding speed. This acquisition of the electrifying time and the non-electrifying time from the table in the storage unit 20 is included in the control calculated by the control unit 10.

Incidentally, due to its characteristics, the head 31 may deteriorate and malfunction if a non-electrifying time equal to or longer than a predetermined time is not secured. As described above, the control unit 10 calculates the electrifying time and the non-electrifying time for the head 31, based on the feeding speed. When the feeding speed becomes faster, the non-electrifying time calculated by the control unit 10 may become shorter than the predetermined time. When the head 31 is controlled with this calculated value itself, the head 31 may deteriorate.

Therefore, a threshold to be compared with the calculated non-electrifying time is stored in the storage unit 20. The control unit 10 acquires the threshold from the storage unit and compares the calculated non-electrifying time with the threshold. When it is determined that the non-electrifying time is less than the threshold (NO in step S103), the control unit 10 corrects the non-electrifying time in such a way that the non-electrifying time becomes equal to or longer than the predetermined time in order to restrain the deterioration of the head 31 (step S105). Meanwhile, when it is determined that the calculated non-electrifying time is more than the threshold (YES in step S103), the control unit 10 uses the calculated non-electrifying time as it is and does not correct the non-electrifying time.

In the description below, for the sake of convenience, a short time, period or cycle is expressed by using a term "small" and a long time, period or cycle is expressed by using a term "large".

The control unit 10 electrifies the head 31, based on the calculated electrifying time and at a timing when a pulse is generated. When the calculated non-electrifying time is smaller than the threshold, the control unit 10 corrects the non-electrifying time in such a way that the non-electrifying time becomes larger. When the calculated non-electrifying time is equal to or larger than the threshold, the control unit 10 does not correct the non-electrifying time, and prints one dot line on the recording paper P (step S104) after a period during which the head 31 is not electrified based on the non-electrifying time. The control unit 10 then ends the processing (END).

In this way, the control unit 10 secures a non-electrifying time equal to or longer than a predetermined time for the head 31 and therefore can restrain the deterioration of the head 31.

Even after correcting the non-electrifying time, the control unit 10 may also correct the electrifying time when the feeding speed becomes faster.

As described above, the control unit 10 sets the print cycle, based on a predetermined number of pulses such as eight pulses. When the feeding speed becomes faster and the period of the pulse becomes smaller, the print cycle, which is the period of eight pulses, becomes smaller, too.

The print cycle is formed of a set of the electrifying time and the non-electrifying time. When the control unit 10 corrects the calculated non-electrifying time in such a way that the non-electrifying time becomes equal to or longer than the predetermined time and the feeding speed becomes faster, the print cycle becomes smaller. Therefore, the calculated electrifying time may not be able to be secured within one print cycle.

When the control unit 10 corrects the calculated non-electrifying time in such a way that the non-electrifying time becomes equal to or longer than the predetermined time and the electrifying time following the corrected non-electrifying time cannot be secured within the print cycle, the control unit 10 corrects the electrifying time following the corrected non-electrifying time in such a way that the electrifying time becomes smaller. Thus, the corrected electrifying time and the corrected non-electrifying time fall within one print cycle. In this case, the timing of starting the electrification may not match the timing of starting the print cycle. Even in this case, there is no change to one print cycle formed of a set of the electrifying time and the non-electrifying time.

1-3. Electrification Control by Control Unit

Electrification control performed on the printing unit 30 by the control unit 10, based on a detection signal DS inputted from the detection unit 50, will now be specifically described, using time charts shown in FIGS. 4 to 7.

Figure 4:
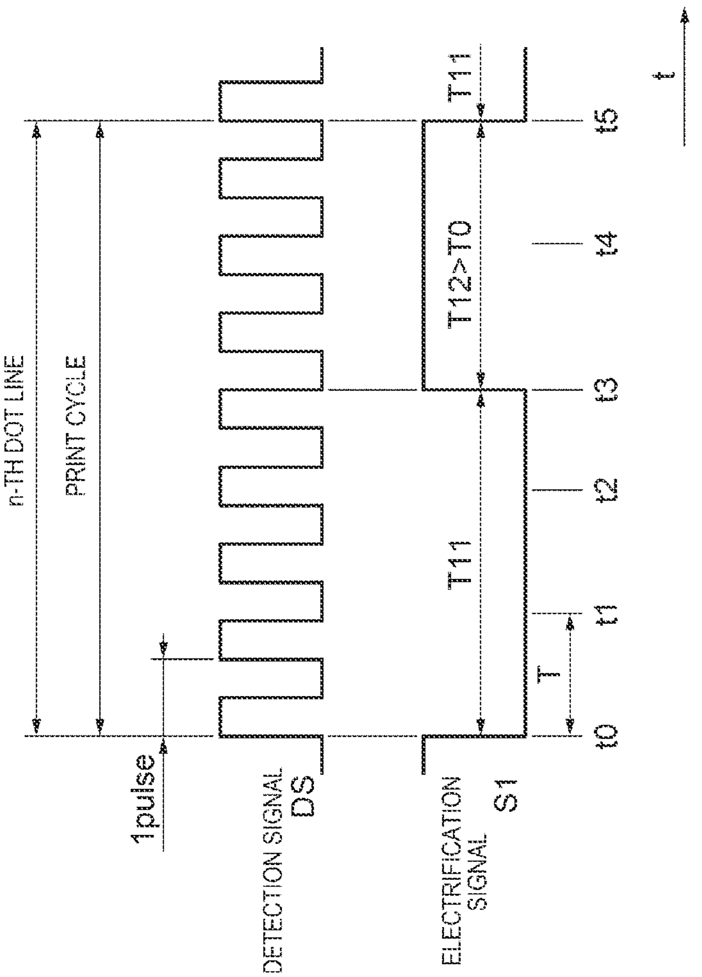
FIG. 4 is a time chart showing electrification control by the control unit according to the embodiment.

First, FIG. 4 will be described. In FIG. 4, the vertical axis represents the voltage of each signal and the horizontal axis represents the lapse of time t. Every predetermined time period T from an arbitrary time point to, time points t1, t2, t3 and the like are shown with the same interval. The signal at the top represents the detection signal DS from the detection unit 50 inputted to the control unit 10. The signal at the bottom represents an electrification signal S1 applied to the head 31 by the control unit 10.

When the voltage of the detection signal DS at the top of FIG. 4 is high-level, it means that the photosensor 51 of the detection unit 50 has detected the position of a slit provided in the disk 52. When the voltage of the detection signal DS is low-level, it means that the photosensor 51 has detected the position of a part of the disk 52 that is not a slit.

The detection signal DS from the detection unit 50 is outputted as a predetermined pulse. One cycle of the detection signal DS from the detection unit 50 is equivalent to one pulse. This pulse corresponds to the rotation of the shaft 44 of the feeder unit 40 and corresponds to the rotation of the roller 43. The number of pulses represents the amount of rotation of the shaft 44 and the roller 43.

The control unit 10 prints one dot line, taking a period when the detection signal inputted from the detection unit 50 is eight pulses, as one cycle of printing. The one cycle of printing is referred to as a print cycle. In FIG. 4, a print cycle is a period from the time point t0 to the time point t5.

A drive circuit installed in the head 31 is low-active. Therefore, when the electrification signal S1 at the bottom has the low-level voltage, the electrification signal S1 represents the electrifying time during which the head 31 is electrified. When the electrification signal S1 has the high-level voltage, the electrification signal S1 represents the non-electrifying time during which the head 31 is not electrified.

The control unit 10 causes the head 31 to print on the recording paper P, while causing the roller 43 to rotate in the CW direction via the shaft 44 of the feeder unit 40 and thus feed the recording paper P.

As an interrupt due to the rise of the first pulse is generated at the time point t0, the control unit 10 starts interrupt processing, based on the timing of this interrupt. The control unit 10 acquires, by the timer, the time of the first pulse when the interrupt is generated, and stores the acquired time in the storage unit 20. Next, the control unit 10 turns the voltage of the electrification signal S1 to low-level and starts to electrify the head 31.

The control unit 10 starts interrupt processing in response to the rise of the second pulse at the time point t1 and acquires, by the timer, the time of the second pulse when the interrupt is generated. The control unit 10 reads out the time of the first pulse from the storage unit 20, compares the acquired time of the second pulse with the time of the first pulse, and thus can calculate the period of one pulse, based on the difference between the times of the two pulses.

When the resolution of the detection signal DS is 1440 pulses per inch, as described above, the recording paper P is fed by the length of 1/1440 inches by the feeder unit 40 during the period of one pulse. The control unit 10 divides the length of 1/1440 inches by which the recording paper P is fed during the period of one pulse of the detection signal DS, by the period of the first pulse calculated as described above, and thus can acquire the feeding speed for the recording paper P corresponding to the first pulse.

The value of the length of the recording paper P fed during the period of one pulse of the detection signal DS is stored in the storage unit 20. The control unit 10 reads out and processes this value.

The control unit 10 acquires the ratio of each of the electrifying time and the non-electrifying time to the calculated feeding speed for the recording paper P and also acquires the reference electrifying time and the reference non-electrifying time, referring to the storage unit 20. The control unit 10 multiplies the reference electrifying time and the reference non-electrifying time by the acquired ratios, respectively, and thus calculates the electrifying time and the non-electrifying time. In the example of the electrification signal S1 shown in FIG. 4, an electrifying time T11 and a non-electrifying time T12 are calculated. As shown in the electrification signal S1 in FIG. 4, the calculated electrifying time T11 represents the period from the time point t0 to the time point t3 and the calculated non-electrifying time T12 represents the period from the time point t3 to the time point t5.

In the storage unit 20, T0, which is the same value as a minimum non-electrifying time to restrain the deterioration of the head 31, is stored as a threshold. The control unit 10 acquires the threshold T0 from the storage unit 20 and compares the calculated non-electrifying time T12 with the threshold T0. In the example shown in FIG. 4, the feeding speed for the recording paper P is low and therefore a sufficient non-electrifying time equal to or more than the threshold T0 can be secured.

It is now assumed that the threshold T0 to determine the non-electrifying time has a value 1.5 times the predetermined time period T shown in FIG. 4. As shown in the electrification signal S1 in FIG. 4, the non-electrifying time T12 calculated by the control unit 10 is the period from the time point t3 to the time point t5 and has a value twice the predetermined time period T.

The control unit 10 can determine that the calculated non-electrifying time T12 is larger than the threshold T0, and therefore can determine that there is no risk of deterioration of the head 31. The control unit 10 uses the calculated value of the non-electrifying time T12 as it is and does not correct the non-electrifying time T12.

As shown in the electrification signal S1 in FIG. 4, the control unit 10 electrifies the head 31 during the period from the time point t0 to the time point t3 of the electrification signal S1, based on the calculated electrifying time T11, and performs non-electrification in which the head 31 is not electrified during the period from the time point t3 to the time point t5 of the electrification signal S1, based on the calculated non-electrifying time T12, and thus prints an n-th dot line on the recording paper P.

The control unit 10 performs control similar to the above from the time point t5 onward and prints the next (n+1)th dot line.

Control by the control unit 10 when the feeding speed for the recording paper P is higher than in the case of FIG. 4 will now be described by comparing an example shown in FIG. 5 and a related-art example shown in FIG. 7.

The related-art example shown in FIG. 7 will be described first. As the feeding speed becomes faster, the period of the pulse of the detection signal DS becomes smaller. Therefore, for an arbitrary n-th dot line, in FIG. 4, the print cycle is the period from the time point t0 to the time point t5 of the electrification signal S1, that is, a value five times the predetermined time period T, whereas in FIG. 7, the print cycle is the period from the time point t0 to the time point t4 of an electrification signal S4, that is, a value four times the predetermined time period T, which is smaller than in FIG. 4.

Figure 7:
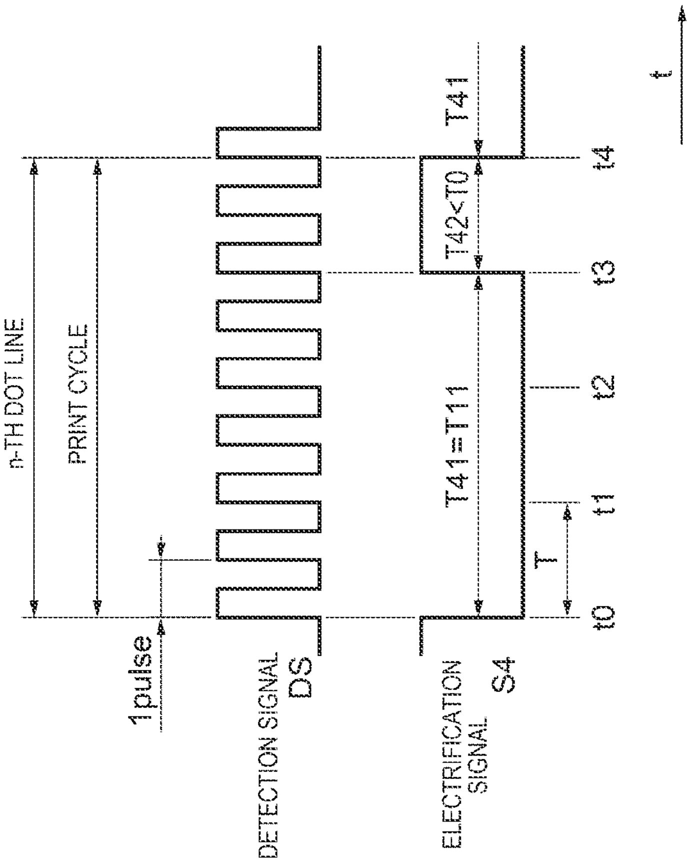
FIG. 7 is a time chart showing electrification control by a control unit at a high speed according the related art.

In the case of FIG. 7, as in the case of FIG. 4, for an arbitrary n-th dot line, the control unit 10 acquires the time point of the rise of the first pulse by interrupt processing of the first pulse at the time point to, turns the volage of the electrification signal S4 to low-level, and starts to electrify the head 31. Next, the control unit 10 acquires the time point of the rise of the second pulse by interrupt processing of the second pulse, compares this time point with the time point of the rise of the first pulse, and thus calculates the period of the first pulse.

The control unit 10 calculates the feeding speed corresponding to the first pulse, based on the period of the first pulse and the length by which the recording paper P is fed during one pulse of the detection signal DS stored in the storage unit 20.

The control unit 10 reads out the ratio of each of the electrifying time and the non-electrifying time corresponding to the calculated feeding speed, and each reference time, from the storage unit 20, and calculates the electrifying time and the non-electrifying time. As shown in the electrification signal S4 in FIG. 7, for an arbitrary n-th dot line, a value calculated by the control unit 10 is an electrifying time T41. This value is the same as the electrifying time T11 in the case of the electrification signal S1 shown in FIG. 4 and represents the period from the time point t0 to the time point t3 of the electrification signal S4. Also, another value calculated by the control unit 10 is a non-electrifying time T42, which represents the period from the time point t3 to the time point t4 of the electrification signal S4.

In this way, according to the related art, it can be said that the control unit 10 preferentially secures the electrifying time within one print cycle and allocates the rest of the time to the non-electrifying time.

The threshold T0 for the control unit 10 to determine the length of the non-electrifying time is a value 1.5 times the predetermined time period T. As shown in the electrification signal S4 in FIG. 7, the non-electrifying time T42 calculated by the control unit 10 is the period from the time point t3 to the time point t4 and has a value equal to the predetermined time period T. Therefore, the control unit 10 determines that the calculated non-electrifying time T42 is smaller than the threshold T0.

According to the related-art control, even when the calculated non-electrifying time T42 is less than the threshold T0, the control unit 10 controls the head 31, using the value as it is. Therefore, a sufficient non-electrifying time cannot be secured, posing a risk of deterioration of the head 31.

The example shown in FIG. 5 will now be described mainly in terms of the difference from the related-art example shown in FIG. 7. In the example shown in FIG. 5, the feeding speed is a high speed as in the related-art example shown in FIG. 7.

Figure 5:
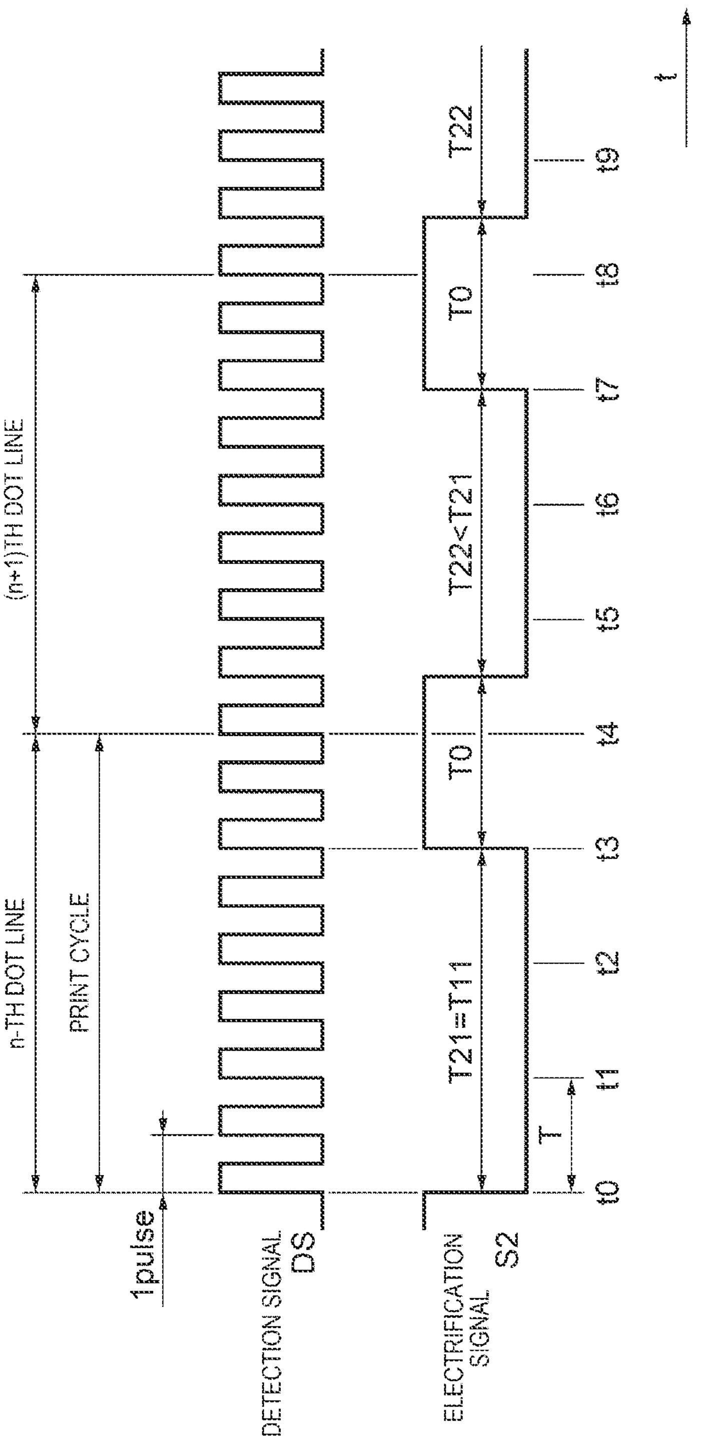
FIG. 5 is a time chart showing an example of the electrification control by the control unit at a high speed according to the embodiment.

Therefore, in the case of FIG. 5, the ratio of each of the electrifying time and the non-electrifying time corresponding to the feeding speed, and each reference time, have the same values as in the case of FIG. 7, and the electrifying time and the non-electrifying time calculated by the control unit 10 have the same values as in the case of the electrification signal S4 shown in FIG. 7.

Specifically, in the case of an electrification signal S2 shown in FIG. 5, as in the case of the electrification signal S4 shown in FIG. 7, the electrifying time calculated by the control unit 10 for an arbitrary n-th dot line is an electrifying time T21. The electrifying time T21 represents the period from the time point t0 to the time point t3 of the electrification signal S2 and has the same value as the electrifying time T41 in the case of FIG. 7. The electrifying time T21 also has the same value as the electrifying time T11 in the case of the electrification signal S1 shown in FIG. 4.

The non-electrifying time calculated by the control unit 10 has the same value as the non-electrifying time T42 in the case of FIG. 7.

In the case of FIG. 5, as in the case of FIG. 7, the non-electrifying time T42 initially calculated by the control unit 10 is a value equal to the predetermined time period T. Meanwhile, the threshold T0 is a value 1.5 times the threshold T0. Therefore, the control unit 10 can determine that the initially calculated non-electrifying time T42 is smaller than the threshold T0.

The control unit 10 corrects the initially calculated non-electrifying time T42 to a non-electrifying time T0 having the same value as the threshold so as to increase the non-electrifying time T42, as shown in the electrification signal S2 in FIG. 5. The control unit 10 electrifies the head 31, based on the electrifying time T21, and prints the n-th dot line on the recording paper P after the period during which the head 31 is not electrified, based on the non-electrifying time T0. The control unit 10 may also correct the initially calculated non-electrifying time T42 to a larger value than the threshold T0.

In this way, the control unit 10 can secure a sufficient non-electrifying time equal to or more than the threshold T0 for the head 31 and therefore can restrain the deterioration of the head 31.

As described above, the control unit 10 corrects the initially calculated non-electrifying time T42 to the non-electrifying time T0 so as to increase the non-electrifying time T42, for the n-th dot line. Therefore, as shown in the electrification signal S2 in FIG. 5, the non-electrifying time T0 extends into the print cycle for the next (n+1)th dot line, and the calculated electrifying time T21 may not be able to be secured for the (n+1)th dot line.

When the control unit 10 determines that the electrifying time T21 following the corrected non-electrifying time T0 cannot be secured, the control unit 10 corrects the electrifying time T21 following the corrected non-electrifying time T0 to an electrifying time T22 so as to reduce the electrifying time T21 for the (n+1)th dot line.

Specifically, the electrifying time T21 following the corrected non-electrifying time T0 is equivalent to the period from the time point t0 to the time point t3 of the electrification signal S2 shown in FIG. 5 and has a value three times the predetermined time period T. The electrifying time T22 resulting from correctively reducing the calculated electrifying time T21, following the corrected non-electrifying time T0, is the period from a timing between the time point t4 and the time point t5 to the time point t7 of the electrification signal S2 and has a value 2.5 times the predetermined time period T.

The corrected value of the electrifying time is stored in the storage unit 20. The control unit 10 reads out and processes this value.

Consequently, as shown in the (n+1)th dot line in FIG. 5, the timing when the electrification signal S2 starts electrification is a timing between the time point t4 and the time point t5 and is shifted from the timing of starting a print cycle at the time point t4. However, the corrected electrifying time T22 and the corrected non-electrifying time T0 fall within one print cycle. In this way, even with a correction, there is no change to one print cycle formed of a set of the electrifying time T22 and the non-electrifying time T0.

In the case where the head 31 is a line thermal head, heat is stored in the head 31 due to the electrification for the n-th dot line and therefore a temperature to develop color for the (n+1)th dot line on the recording paper P can be secured even when the electrifying time for the (n+1)th dot line is reduced. Thus, a good print result can be achieved.

Another example of the electrification control by the control unit 10 at a high speed according to the embodiment will now be described, referring to a time chart shown in FIG. 6. Particularly, the difference from the case of FIG. 5 will be described mainly. The same feeding speed is used in the example shown in FIG. 6 and the example shown in FIG. 5.

Figure 6:
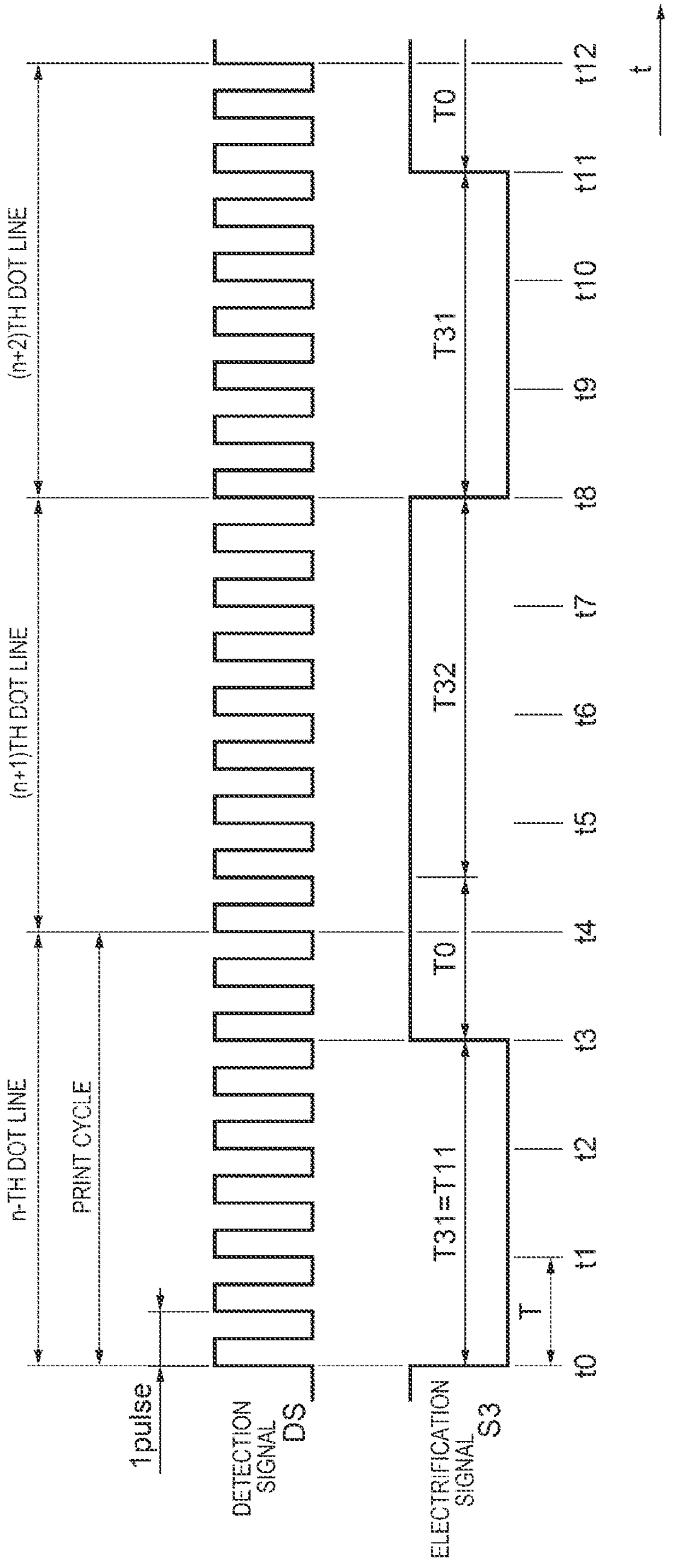
FIG. 6 is a time chart showing another example of the electrification control by the control unit at a high speed according to the embodiment.

Therefore, in the case of FIG. 6, the ratio of each of the electrifying time and the non-electrifying time corresponding to the feeding speed, and each reference time, have the same values as in the case of FIG. 5, and the electrifying time and the non-electrifying time calculated by the control unit 10 also have the same values as in the case of FIG. 5.

Specifically, in the case of FIG. 6, as in the case of FIG. 5, a value calculated by the control unit 10 for an arbitrary n-th dot line is an electrifying time T31. The electrifying time T31 represents the period from the time point t0 to the time point t3 of an electrification signal S3 and has the same value as the electrifying time T21 of the electrification signal S2 shown in FIG. 5. The electrifying time T31 also has the same value as the electrifying time T11 of the electrification signal S1 shown in FIG. 4.

The non-electrifying time calculated by the control unit 10 has the same value as the initially calculated non-electrifying time T42 of the electrification signal S2 in the case of FIG. 5 and has the same value as in the case of FIG. 7.

In the case of FIG. 6, as in the case of FIG. 5, the non-electrifying time T42 initially calculated by the control unit 10 has a value equal to the predetermined time period T, and the threshold T0 is a value 1.5 times the predetermined time period T. Therefore, the control unit 10 determines that the initially calculated non-electrifying time T42 is smaller than the threshold T0.

As shown in the electrification signal S3 in FIG. 6, the control unit 10 corrects the initially calculated non-electrifying time T42 to the non-electrifying time T0 having the same value as the threshold T0 so as to increase the non-electrifying time T42. The control unit 10 electrifies the head 31, based on the electrifying time T31, and prints the n-th dot line on the recording paper P after the period during which the head 31 is not electrified, based on the non-electrifying time T0.

As described above, the control unit 10 corrects the initially calculated non-electrifying time T42 to the non-electrifying time T0 so as to increase the non-electrifying time T42, for the n-th dot line. Therefore, as shown in the electrification signal S3 in FIG. 6, the non-electrifying time T0 extends into the print cycle for the next (n+1)th dot line.

However, the (n+1)th dot line is a part where no printing is performed, such as a blank, and the control unit 10 does not perform electrification for the (n+1)th dot line, unlike in the case of the electrification signal S2 in FIG. 5. Therefore, a period T32 during which electrification is not performed following the non-electrifying time T0 is a period from a timing between the time point t4 and the time point t5 to the time point t8 of the electrification signal S3.

In this way, the control unit 10 can secure the period T32 during which electrification is not performed following the non-electrifying time T0 for the head 31 as shown in the electrification signal S3, and therefore can sufficiently restrain the deterioration of the head 31.

For the (n+2)th dot line of the electrification signal S3 shown in FIG. 6, the timing when the control unit 10 starts electrification is the timing of starting the print cycle at the time point t8 of the electrification signal S3, as for the n-th dot line. Since the control unit 10 need not secure an electrifying time for the (n+1)th dot line of the electrification signal S3, a shift of the timing of starting electrification from the timing of starting the print cycle as in the case of the (n+1)th dot line of the electrification signal S2 in FIG. 5 does not occur.

The electrifying time for the (n+2)th dot line of the electrification signal S3 is the electrifying time T31 calculated by the control unit 10 and is not correctively reduced. This electrifying time T31 is the same as for the n-th dot line.

In the case where the head 31 is a line thermal head, since the temperature of the head 31 is lowered due to the non-electrification for the (n+1)th dot line, the control unit 10 does not reduce the electrifying time for the (n+2)th dot line and secures a temperature to develop color on the recording paper P. Thus, a good print result can be achieved.

The foregoing embodiment can achieve the effects described below.

The printing device 1 according to the one embodiment includes: the printing unit 30 printing on the recording paper P; the feeder unit 40 having the roller 43, which rotates about the shaft 44 and feeds the recording paper P, and the motor 41, which rotates the shaft 44; the detection unit 50 detecting the rotation of the shaft 44; and the control unit 10 controlling the printing unit 30. The control unit 10 calculates an electrifying time during which the printing unit 30 is electrified and a non-electrifying time during which the printing unit 30 is not electrified following the electrifying time, based on a detection signal from the detection unit 50. When the calculated non-electrifying time is less than a predetermined time, the control unit 10 corrects the non-electrifying time in such a way that the non-electrifying time becomes equal to or longer than the predetermined time, and causes the printing unit 30 to print.

According to the above configuration, a non-electrifying time equal to or longer than a predetermined time can be secured and the deterioration of the printing unit 30 can be restrained.

The embodiment has been described in detail with reference to the drawings. However, the present disclosure is not limited to any specific configuration in the embodiment. Any change, replacement, deletion or the like can be made without departing from the spirit and scope of the present disclosure.

For example, while the printing device 1 is described referring to an example where the head 31 is a line thermal head, the type of the head 31 is not limited. For example, a heat-generating inkjet head may be employed. Also, a serial head installed in a carriage so as to scan may be employed.

Also, while an example where the motor 41 is a DC motor is described, other types of motors such as a step motor may be employed.

Also, while an example where the detection unit 50 is an encoder is described, other detection systems such as a tachogenerator may be employed.

Also, while the recording paper P is described as being rolled as the paper roll 90, a cut paper of A4 size or the like may be employed.

Moreover, while an example where the disk 52 of the detection unit 50 is attached to the shaft 44 is described, the disk 52 may be attached to the shaft of the gear 42 or the shaft of the motor 41, provided that the detection unit 50 can directly or indirectly detect the rotational position of the shaft 44.

What is claimed is:

1. A printing device comprising:

a printing unit printing on a recording paper;

a feeder unit having a roller that rotates about a shaft and feeds the recording paper and a motor that rotates the shaft;

a detection unit detecting the rotation of the shaft; and a control unit controlling the printing unit, wherein the control unit calculates an electrifying time during which the printing unit is electrified and a non-electrifying time during which the printing unit is not electrified following the electrifying time, based on a detection signal from the detection unit, and when the calculated non-electrifying time is less than a predetermined time, the control unit corrects the non-electrifying time in such a way that the non-electrifying time becomes equal to or longer than the predetermined time, and causes the printing unit to print.

2. The printing device according to claim 1, wherein when the control unit corrects the non-electrifying time, the control unit also corrects the electrifying time following the non-electrifying time.

3. The printing device according to claim 1, wherein the printing unit is a line thermal head, the motor is a DC motor, and the detection unit includes an encoder detecting the rotation of the shaft.

4. A method for controlling a printing device, the printing device comprising a printing unit printing on a recording paper, a feeder unit having a roller that rotates about a shaft and feeds the recording paper and a motor that rotates the shaft, a detection unit detecting the rotation of the shaft, and a control unit controlling the printing unit, the method comprising:

calculating an electrifying time during which the printing unit is electrified and a non-electrifying time during which the printing unit is not electrified following the electrifying time, based on a detection signal from the detection unit; and when the calculated non-electrifying time is less than a predetermined time, correcting the non-electrifying time in such a way that the non-electrifying time becomes equal to or longer than the predetermined time, and causing the printing unit to print.

* * * * *